United States Patent
Jiang et al.

(10) Patent No.: US 9,261,382 B2
(45) Date of Patent: Feb. 16, 2016

(54) SYSTEM AND METHOD FOR MECHANICAL RUNOUT MEASUREMENT

(71) Applicant: General Electric Company, Schenectady, NY (US)

(72) Inventors: Jie Jiang, Clifton Park, NY (US); Huageng Luo, Clifton Park, NY (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 47 days.

(21) Appl. No.: 14/285,186

(22) Filed: May 22, 2014

(65) Prior Publication Data
US 2015/0338240 A1    Nov. 26, 2015

(51) Int. Cl.
| | | |
|---|---|---|
| *G01B 7/30* | (2006.01) | |
| *G01D 5/14* | (2006.01) | |
| *G01B 7/312* | (2006.01) | |
| *G01B 11/02* | (2006.01) | |

(Continued)

(52) U.S. Cl.
CPC ........ *G01D 5/14* (2013.01); *G01B 7/312* (2013.01); *G01B 11/026* (2013.01); *G01B 11/2408* (2013.01); *G01B 7/023* (2013.01)

(58) Field of Classification Search
CPC ....... F01D 25/28; F01D 17/02; F01D 21/003; F05D 2230/644; F05D 2270/804; F05D 2270/821; G01B 11/026; G01B 11/2408; G01B 7/312; G01B 21/12; G01B 7/144; F02K 3/06; H02K 15/165; G01N 27/9033
USPC ........................................ 324/207.25, 207.26
See application file for complete search history.

(56) References Cited

U.S. PATENT DOCUMENTS 3,658,428 A    4/1972    Voigtlaender-Tetzner
4,135,244 A    1/1979    Davis (Continued)

FOREIGN PATENT DOCUMENTS

| EP | 1 398 610 A1 | 3/2004 |
| EP | 1 398 610 B1 | 5/2005 |

(Continued)

OTHER PUBLICATIONS

European Communication and Search Report issued in EP Application No. 15167980.0 on Jul. 16, 2015, 5 pages.

*Primary Examiner* — Jay Patidar
(74) *Attorney, Agent, or Firm* — Nixon & Vanderhye, P.C.

(57) ABSTRACT

A method of measuring mechanical runout including: mounting a work piece on a rotatable mount, wherein the mount is configured to rotate the work piece; placing a displacement sensor at a known position adjacent a surface of the work piece, the displacement sensor being configured to measure a radial dimension of the work piece; attaching a removable angle indicator to the surface of the work piece; rotating the work piece while mounted on the mount and collecting rotational data of the rotational position of the work piece during the rotation; collecting displacement data from the displacement sensor as the work piece rotates, wherein the displacement data indicates a radial distance from a rotational axis of the work piece to the surface of the work piece at points on the surface as the surface rotates with respect to the displacement sensor; analyzing the displacement data to detect data representing the angle indicator on the surface of the work piece; correlating the displacement data with the rotational data, and determining displacements of points on the surface of the work piece based on the correlated displacement data.

15 Claims, 8 Drawing Sheets

(51) Int. Cl.
*G01B 11/24* (2006.01)
*G01B 7/02* (2006.01)

(56) References Cited

U.S. PATENT DOCUMENTS

| | | | | |
|---|---|---|---|---|
| 4,460,869 | A | * | 7/1984 | Buser ................. G01K 7/36 324/200 |
| 4,775,947 | A | | 10/1988 | Marron |
| 4,967,154 | A | | 10/1990 | Marantette |
| 5,072,181 | A | | 12/1991 | Burger |
| 5,140,534 | A | | 8/1992 | Miller et al. |
| 5,224,272 | A | | 7/1993 | Toraason et al. |
| 5,854,553 | A | * | 12/1998 | Barclay ................. G01V 3/101 324/207.12 |
| 6,084,400 | A | | 7/2000 | Steinich et al. |
| 6,741,074 | B2 | | 5/2004 | DeBlock et al. |
| 6,757,636 | B2 | | 6/2004 | Bluestein |
| 7,026,637 | B2 | | 4/2006 | Sarr |
| 7,040,026 | B2 | | 5/2006 | Hirano et al. |
| 7,064,818 | B2 | | 6/2006 | Braghiroli |
| 7,210,321 | B2 | | 5/2007 | George |
| 7,339,860 | B2 | | 3/2008 | Ishimoto |
| 7,433,047 | B1 | | 10/2008 | Peale et al. |
| 7,792,600 | B2 | | 9/2010 | Borneman et al. |
| 7,924,519 | B2 | * | 4/2011 | Lambert ............ G11B 5/59627 360/31 |
| 7,946,181 | B2 | | 5/2011 | Kim et al. |
| 8,295,004 | B2 | | 10/2012 | Sudo |
| 8,307,561 | B2 | | 11/2012 | Inoue et al. |
| 2002/0178594 | A1 | | 12/2002 | Hirano et al. |
| 2003/0164699 | A1 | | 9/2003 | DeBlock et al. |
| 2004/0015326 | A1 | | 1/2004 | Bluestein |
| 2004/0051864 | A1 | | 3/2004 | Braghiroli |
| 2004/0226336 | A1 | * | 11/2004 | George ................. B21D 3/16 72/362 |
| 2004/0264314 | A1 | | 12/2004 | Ishimoto |
| 2011/0113637 | A1 | | 5/2011 | Inoue et al. |
| 2011/0141617 | A1 | | 6/2011 | Sudo |
| 2011/0239761 | A1 | | 10/2011 | Jiang et al. |
| 2011/0309828 | A1 | | 12/2011 | Kikaganeshwala |
| 2012/0173197 | A1 | | 7/2012 | Craig et al. |
| 2014/0051337 | A1 | | 2/2014 | Queen et al. |

FOREIGN PATENT DOCUMENTS

| | | |
|---|---|---|
| EP | 1 992 909 A1 | 11/2008 |
| EP | 2 055 403 A2 | 5/2009 |
| EP | 2 306 170 A1 | 4/2011 |
| JP | 2008096152 A | 4/2008 |
| WO | WO 2012/091821 A1 | 7/2012 |

* cited by examiner

SYSTEM AND METHOD FOR MECHANICAL RUNOUT MEASUREMENT

BACKGROUND OF THE INVENTION

The invention relates to measuring mechanical runout of a rotating work piece.

A uniform radius is desirable around the circumference of rotating work pieces such as the rotor work piece of a turbine. Knowing the shape of a work piece relative to ideal roundness may be used to compensate for or reduce vibration induced by rotation of the work piece. Measuring a radius at each circumference along the length of an entire work piece often requires a great deal of time and cost, primarily associated with labor.

"Runout", generally, is the amount of deviation from a desired rotation radius of a rotor during operation, and can be described in terms of mechanical runout and electrical runout. The mechanical runout of a rotor is the deviation from an ideal circular geometry of the rotor plane during rotation. Accurate measurement of the mechanical runout is necessary to be able to minimize the negative impact of these imperfections on performance, such as vibration of the rotor at operational speeds.

In addition to knowing generally the shape of the surface of a mechanical rotor and how far the rotor is from an ideal circular geometry, there is value in knowing the angular position of each piece of surface information relative to some reference point. Therefore, it is desirable to measure mechanical runout as a function of work piece angular position. Currently available options to accurately measure runout as a function of angular position require (1) a human to manually determine and measure an angular position; or (2) the use of phase reference probes.

Measurements taken at speeds of 15% or lower of rated speeds for the work piece in question are called "slow roll mechanical runout." The slow roll mechanical runout provides an indication as to whether the work piece will function properly during normal operation, as it is an indication of the irregularities in surface shape.

Currently, the runout is measured in one of a few ways: (1) a complete manual 12-point runout, (2) a semi-manual 12-point runout, (3) use of a high sample rate digital sensor, i.e., a CL profiler, or (4) use of phase reference indicators, which require additional instrumentation.

Other available runout measurement methods require additional instrumentation. Key phasors, encoders, magnets and magnetic field sensors are potential options. Some options, like phase reference probes, may require the work piece to be altered to create an intentionally-machined discontinuity, such as a slot or key way, to serve as a once-per-revolution indicator. Under this method, phase references probes are positioned over a machined discontinuity in the work piece and provide a once-per-turn reference pulse from which the phase angle of the vibration can be determined.

BRIEF DESCRIPTION OF THE INVENTION

To minimize cost and difficulty of measuring slow roll mechanical runout, a mechanical runout measurement system is disclosed that includes: a mount for a work piece, wherein the mount is configured to rotate the work piece; a displacement sensor adjacent a surface of the work piece, at a known position relative to the mount and configured to measure a radial dimension of the work piece; a removable angle indicator attached to the work piece and aligned such that the angle indicator is sensed by the displacement sensor during rotation of the work piece, and a computer system including a non-transitory memory which stores instructions that, when performed, cause the computer to: collect radial displacement data from the displacement sensor adjacent to the work piece as the work piece rotates, wherein the radial displacement data indicates a radial dimension of a surface of the work piece sensed by the displacement sensor; detect a portion of the radial displacement data representing the angle indicator in the collected radial displacement data; set an angular starting point at the portion; and correlate each point of the radial displacement data with an angular location relative to and based on the angular starting point to determine a rotational position for the collected radial displacement data of the work piece relative to the angle indicator.

A method of measuring mechanical runout has been conceived and is disclosed comprising: mounting a work piece on a mount, wherein the mount is configured to rotate the work piece; placing a displacement sensor at a known position adjacent a surface of the work piece, the displacement sensor being configured to measure a radial dimension of the work piece; attaching a removable angle indicator to the surface of the work piece; rotating the work piece while mounted on the mount and collecting rotational data of the rotational position of the work piece during the rotation; collecting displacement data from the displacement sensor as the work piece rotates, wherein the displacement data indicates a radial distance from a rotational axis of the work piece to the surface of the work piece at points on the surface as the surface rotates with respect to the displacement sensor; analyzing the displacement data to detect data representing the angle indicator on the surface of the work piece; correlating the displacement data with the rotational data, and determining displacements of points on the surface of the work piece based on the correlated displacement data.

The method may further include generating a presentation of the determined displacements, and the presentation may show the determined displacements overlapped with desired displacements for the work piece.

The method may include filtering the detected data representing the angle indicator from the displacement data before determining the displacements. Further, the attachment of the removable angle indicator may be a wire to the surface and attaching the wire with an adhesive tape applied over the wire and the surface.

The method may include moving the displacement sensor across the surface of the work piece, i.e., down the length, while the work piece remains mounted on the mount and thereafter collecting additional displacement data from the displacement sensor as the work piece rotates and using the additional displacement data to determine displacements of points on the surface of the work piece.

DETAILED DESCRIPTION OF THE INVENTION

The present invention relates to the inclusion of a purposefully created temporary artifact on a rotating work piece. Data indicating the artifact is included in sampled data concerning the roundness of the work piece. The sampled data is analyzed to identify a reference point, provided by the artifact, for all of the data sampled around the circumference of the work piece during rotation. While in the past such an artifact, if permanent, would be considered a flaw and reduce the value of the work piece, a purposely created temporary artifact allows a computer system to recognize and assign a zero degree point to 360 degrees worth of data taken at each radial slice of the work piece.

Such a reference point makes it possible to correlate collected sampled data regarding the roundness of the work piece to specific locations on the work piece while the work piece is still mounted on a mount, for example, a test station, a turbine casing, or workstation. A technician can measure the roundness of a work piece and know the angular positions for every point of roundness data on the work piece (without having to damage the work piece or involve very expensive labor-intensive measuring techniques).

Figure 1:
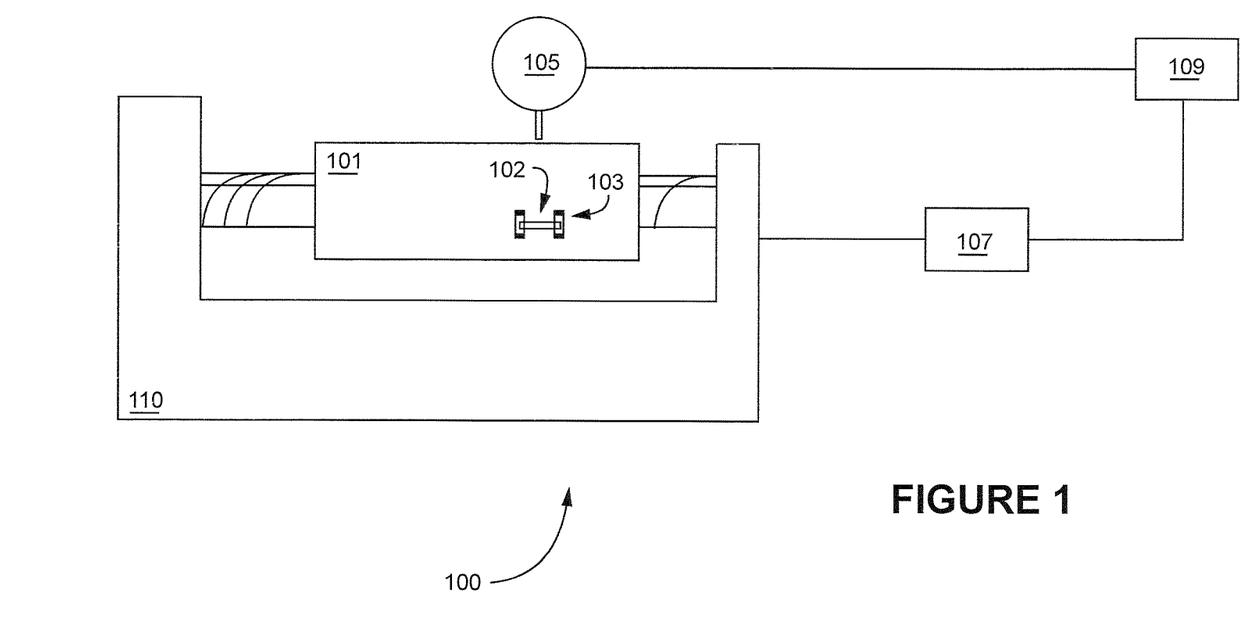
FIG. 1 shows generally an exemplary embodiment of the invention.

FIG. 1 illustrates a perspective view of a mechanical runout measurement system 100 according to the invention. A work piece 101 is mounted on a rotatable mount 110. The work piece may be the rotor shaft of a turbine or other rotatable machine element.

The mount 110 may be any known type of rotatable mount, including but not limited to any electrodynamic system involving rotatable work pieces, a turbine system, or any of a variety of instruments and machine tools used to analyze or machine work pieces.

As part of the system 100, a high sample rate digital proximity sensor 105 is coupled to machining tool 110 at a known distance from work piece 101 using known coupling techniques (not shown). An instrument or machine tool (not shown) may also optionally be coupled to the mount 110 if desired.

Sensor 105 may be a digital sensor capable of detecting the proximity of the surface of the work piece 101 to the tip of the sensor, including a variety of contact and non-contact sensors. For example, sensor 105 may be any digital proximity sensor that measures displacement through being in physical contact with the surface of the rotor as it rotates. Sensor 105 may also be any digital proximity sensor that measures displacement through measurement of eddy currents (capacitive displacement sensors) being generated in a work piece at a known distance.

The digital proximity sensor 105 is able to movably be positioned along the entirety of the length of the work piece. The digital proximity sensor 105 may be movably positioned in closer or less close proximity to the surface of the work piece 101. The coupling of and moving of sensor 105 and the optional cutting tool may be accomplished manually or through a computer system 109 associated with system 100.

After sensor 105 has been positioned at a linear position of interest on the work piece 101, a measurement technician (not shown) manually attaches a removably attachable angle indicator 102 to work piece 101 at any location along its circumference using an impermanent adhesive 103 such that indicator 102 will be detected by sensor 105 during rotation of work piece 101.

The indicator 102 could be any removably attachable indicator 102 compatible with the chosen sensor 105 and its method of detecting proximity. For example, in the case where sensor 105 is a contact-based proximity sensor, any small item that can be removably affixed to the work piece, be detected through physical contact with the sensor, and not affect performance during rotation of work piece 101 is acceptable. In the case where sensor 105 is a non-contact-based proximity sensor, any small item that can be removably affixed to the work piece, be detected through capacitive current generation, and not affect performance during rotation of work piece 101 is acceptable. A fine wire may be used as indicator 102.

The adhesive 103 could be any impermanent adhesive 103 capable of removably attaching indicator 102 to the work piece that would not damage the work piece during use or removal of the adhesive or interfere with measurements taken during rotation of work piece 101. Duct tape may be used as adhesive 103.

Once indicator 102 is attached in a position on work piece 101 that will be detected by sensor 105 during rotation, the measurement technician is able to activate the slow roll measurement system 100. The system, once activated, causes the work piece 101 to rotate via rotation control 107, which may be integrated with computer 109 or a separate control system.

During rotation, sensor 105 samples and records radial displacement data, representing the mechanical runout of work piece 101, and stores the data in computer 109. For every full rotation, indicator 102 passes by the detection apparatus of sensor 105, causing an artifact to appear in the collected data.

Once the artifact has been sampled along with at least one full rotation of radial displacement data, the indicator 102 may be removed as long as the work piece 101 remains mounted on the same machining tool 110. Computer system 109 is provided with programming configured to recognize the artifact as a placeholder denoting a zero-degree location out of 360 degrees worth of displacement data collected from around the entire circumference of work piece 101. The computer system 109 is provided with programming configured to then assign angular location data as an address associated with each piece of sampled data and store the addresses along with the corresponding displacement data.

With the angular location of every point around the circumference of the work piece 101 assigned and stored in the computer 109, the sensor 105 may be moved along the length of the work piece to sample any radial slice along its circumference for displacement data. The sensor may be moved manually or through an automated system to another position along the length of the work piece 101. The work piece 101 may be rotated to again collect radial displacement data representing mechanical runout for any radial slice along the length of the work piece 101. The computer 109 will also assign angular location data to every data point sampled for these additional slices based on the amount of rotation relative to the originally sampled slice containing the artificially created artifact made with indicator 102.

The great value of this advancement over currently available options is the ability to quickly and inexpensively measure mechanical runout of a work piece 101 while the work piece is still mounted on the rotatable mount 110. Technicians can view the data on a monitor accompanying computer 109 and see the data in terms of at least raw numbers, linear graphs showing displacement, and polar plots showing roundness of the work piece.

If a manufacturer chooses to use this system during the manufacturing process and decides the work piece 101 has imperfections that require further machining, the optional cutting tool can be deployed, either manually or through automation, to further machine work piece 101. In the alternative, the computer 109 can be provided with instructions to automatically engage the optional cutting tool to correct imperfections found on work piece 101, where work piece 101 is found to have imperfections outside a predetermined acceptable range.

Figure 2:
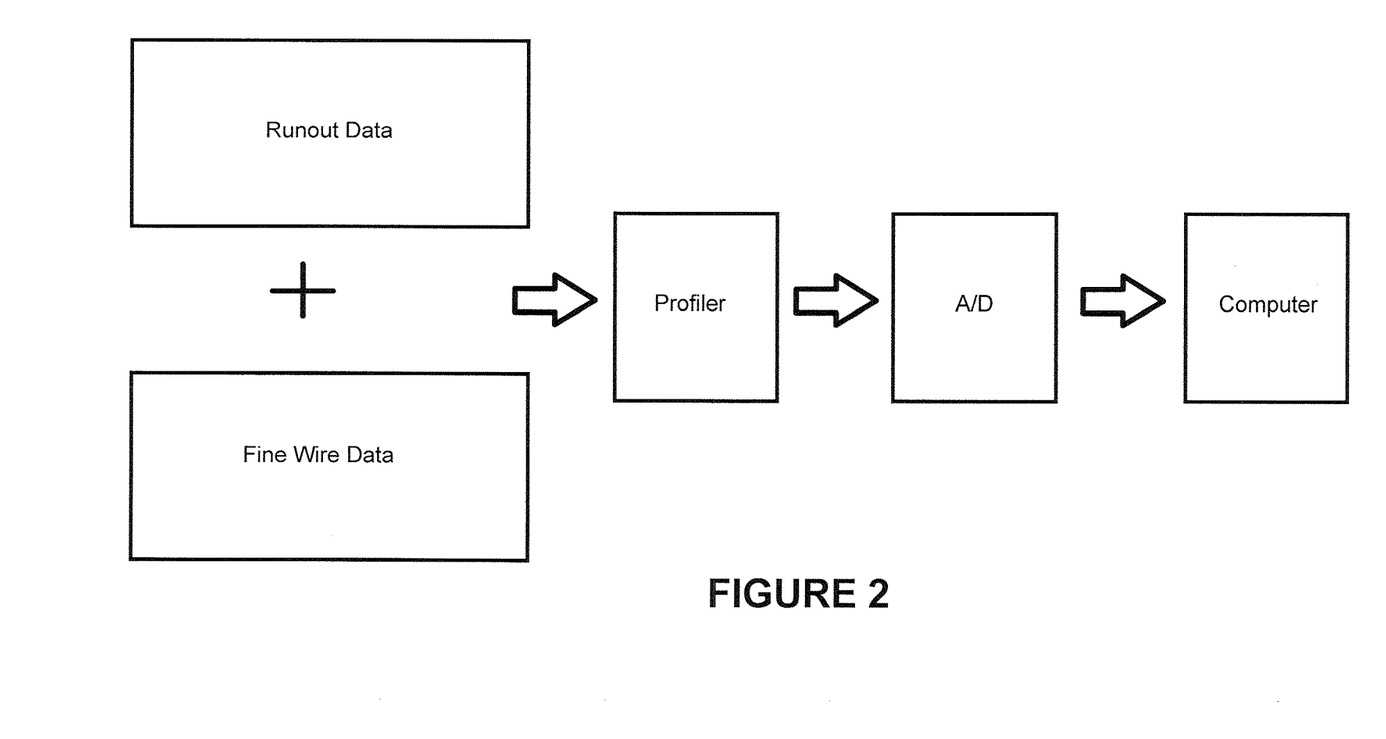
FIG. 2 shows generally a flow chart of the operation of an exemplary embodiment of the invention.

FIG. 2 is a general flowchart demonstrating the collection of data by system 100. As the work piece 101 rotates, radial displacement data is collected by sensor 105, the data including the shape of work piece 101 and also a sharp peak when sensor 105 encounters indicator 102. In this embodiment, the indicator 102 is a fine wire and the sensor 105 is a profiler. The sensor then performs analog to digital conversion of the collected data and sends the data to computer 109 for processing and analysis.

Figure 3:
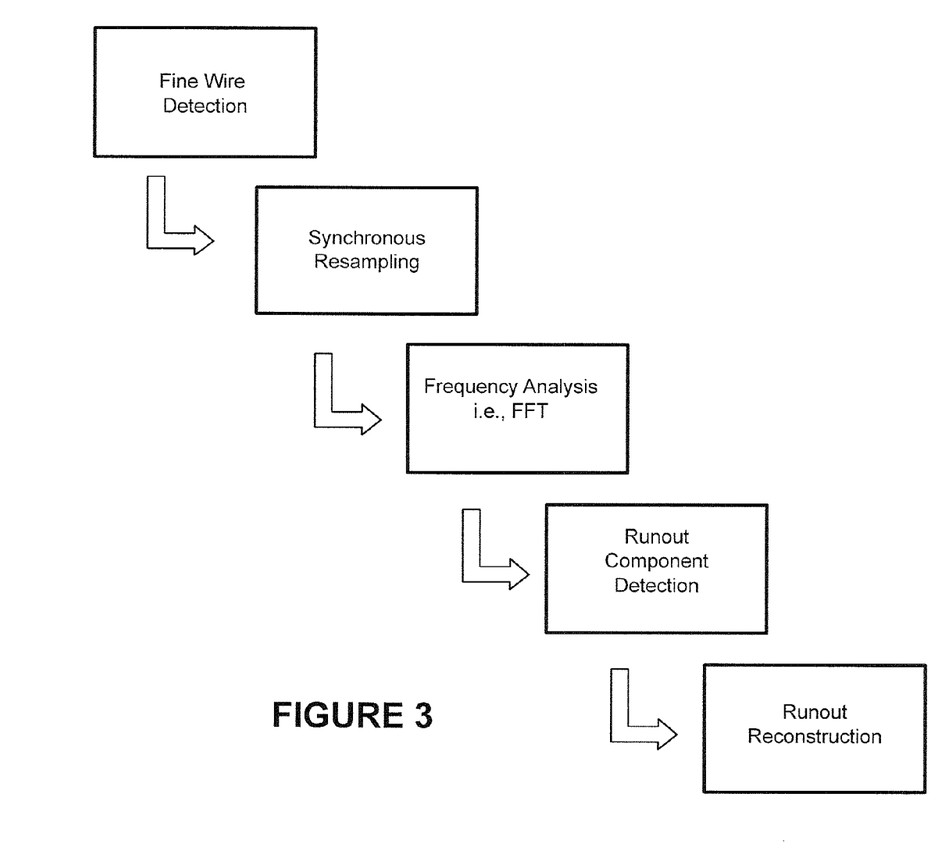
FIG. 3 shows generally a flowchart of tasks performed by a computer system of an exemplary embodiment of the invention.

FIG. 3 is a general flowchart of the operations performed by computer 109 after receiving the data collected by sensor 105 during rotation of work piece 101 with indicator 102 attached thereto. Computer 109 follows the steps of: (1) collecting the data sent from sensor 105, (2) recognizing the detection of indicator 102, (3) performing synchronous resampling of the data, (4) performing data analysis and using frequency analysis, i.e., a Fast-Fourier Transform, to filter out the artifact created by indicator 102, (5) extracting the runout component of the data, and then (6) reconstructing and presenting the runout data numerically and graphically.

A technical effect of the invention, as described in connection with the flowchart found in FIG. 3, is the ability of the computer system to assign angular locations relative to the indicator to every piece of collected radial data for each circumferential slice of the work piece. Once the computer system recognizes the location of the angular indicator, the indicator is able to be removed with no damage to the work piece, no need for large human capital expenditures for taking measurements, and no loss in the ability of the computer system to collect meaningful data concerning the roundness of a work piece. With the information provided by the angular indicator, the computer system can then measure and record radial displacement data at any point along the length of the work piece for the entire circumference of the work piece at that point and use the indicator location to assign an address to every data point collected. This collected information can be used to display or analyze the data, or to correct any imperfections in the roundness of the work piece using a variety of techniques, including balancing, compensating using mechanical and computer based tools, and any optional associated cutting tools. Thanks to the temporary presence of the indicator, the computer system can record and correlate runout data for an entire work piece with the location of each data point on the work piece, thereby notifying a manufacturer of the correctness of the machining as well as providing a simple, efficient, and low cost process to monitor and assure the quality of their products.

Figure 4:
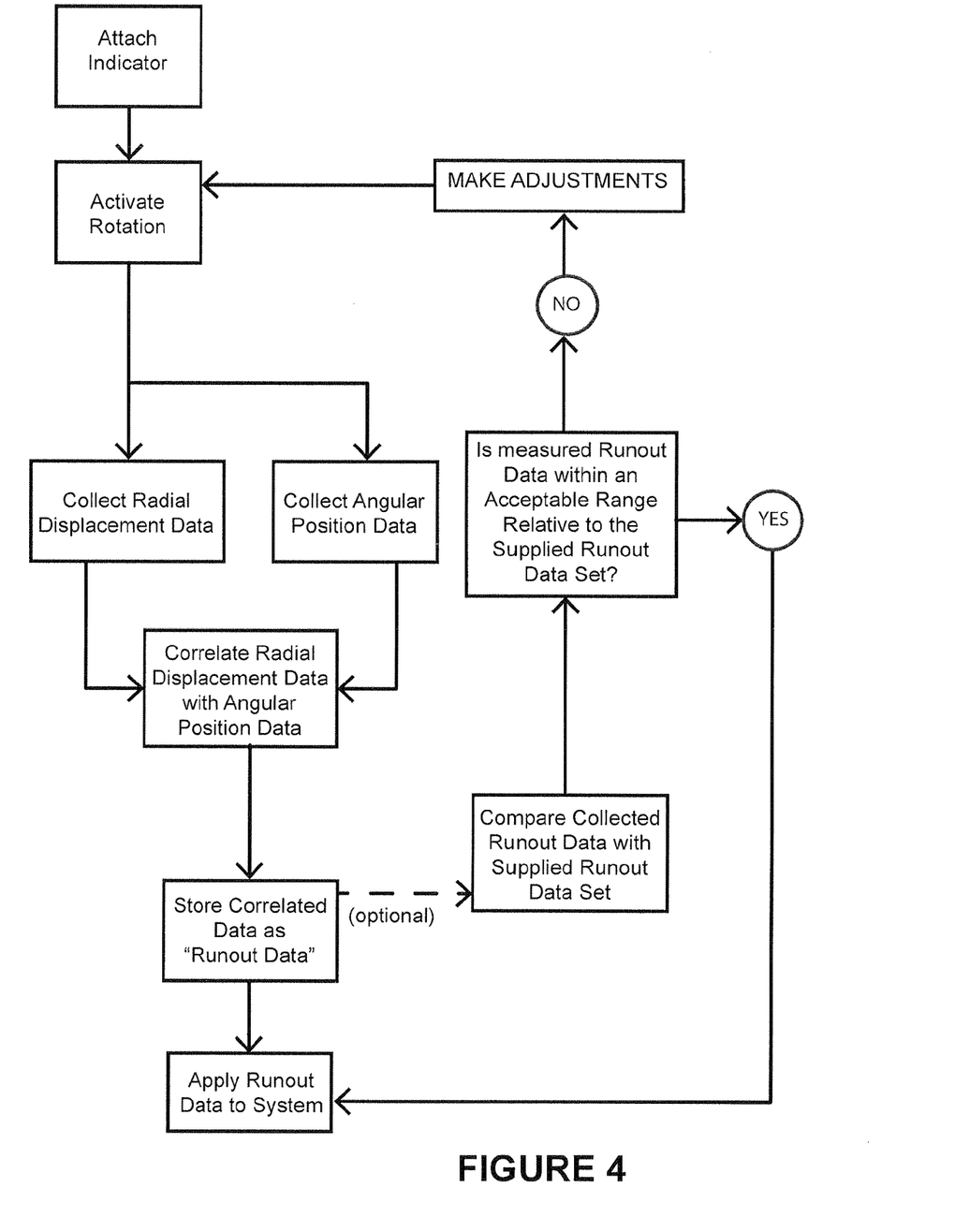
FIG. 4 is a general flowchart of a method to obtain runout data and apply it to a system based on the correlated displacement and angular location data.

FIG. 4 is a general flowchart of a method to obtain runout data, apply the data to a system, and optionally to compare the data with a supplied runout data set. The supplied runout data set can be a set of ideal values for roundness, a hypothetical data set of minimally acceptable values for roundness, or some other data set meant to be compared to the collected data. A person attaches an indicator to a work piece still mounted on a rotatable mount, which is then rotated while data concerning its roundness (via radial displacement data) is taken and compared with predetermined accepted tolerance values. Once the data is collected, it can be applied to a system for which the work piece is designed to be used. Optionally, the collected data values may be compared with an additional supplied data set, and, if the values are outside of tolerances, adjustments may be made, either to the system or to the work piece. For example, a variety of compensation techniques, including balancing the system for use, or employing cutting tools to shape the work piece to be closer to the desired shape, may be utilized. If a user chooses to make adjustments, the data may again be sampled. This process optionally continues until the work piece is within acceptable tolerance values or the compensation techniques remove any negative effects due to imperfections in the work piece. If desired, the system can be configured to notify the operator via data values and/or sensory notification that the work piece is round within predetermined allowances or that compensation has been achieved.

Figure 5:
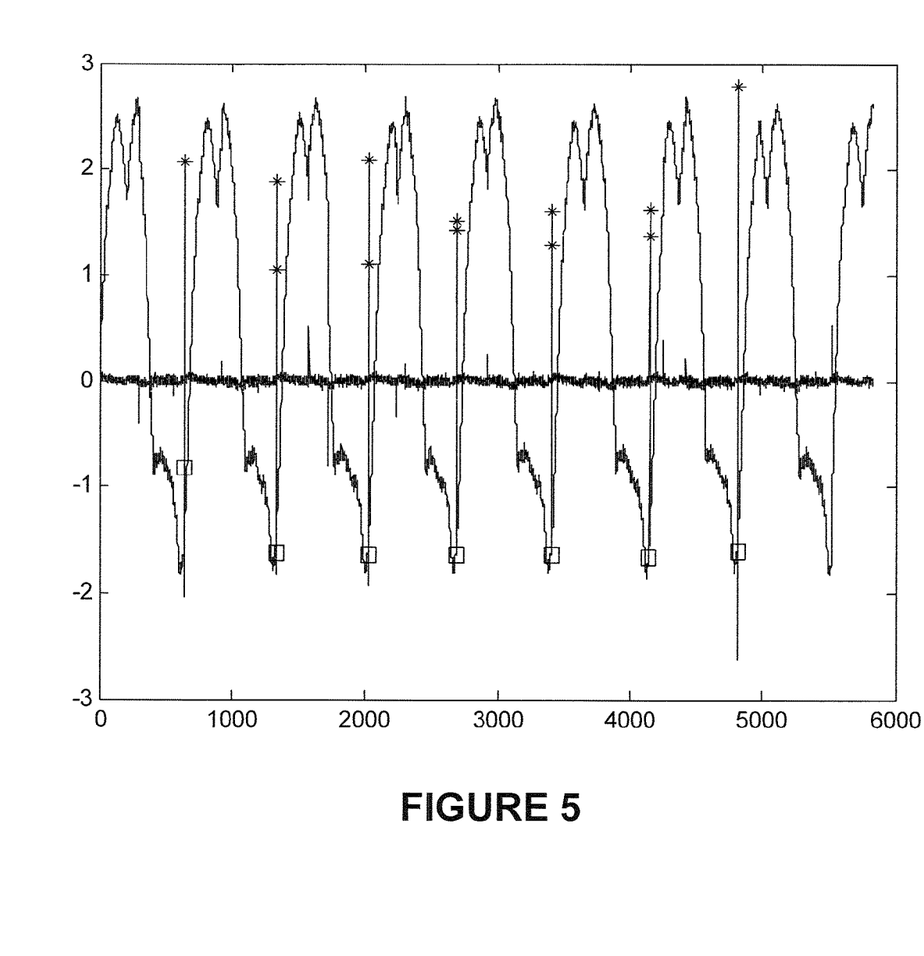
FIGS. 5-9 shows generally exemplary types of graphical output produced by a computer as a result of processing the data received from a digital sensor.
Figure 6:
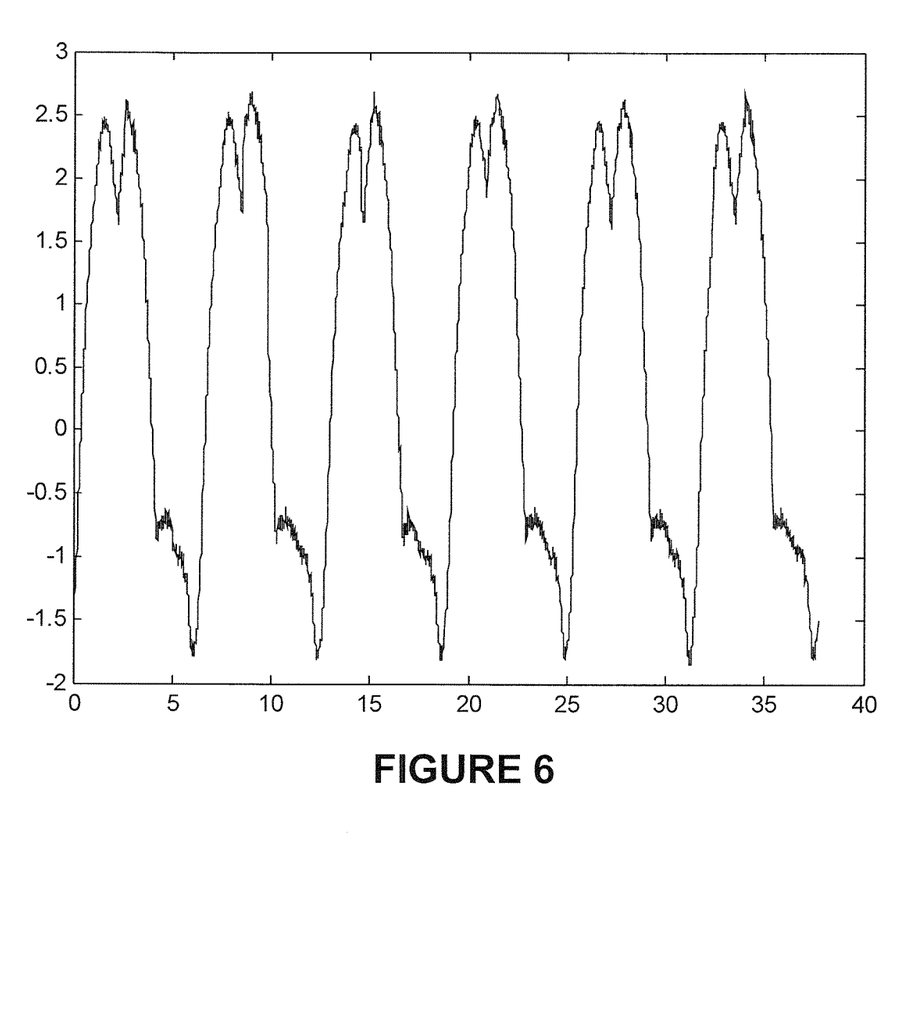
Figure 7:
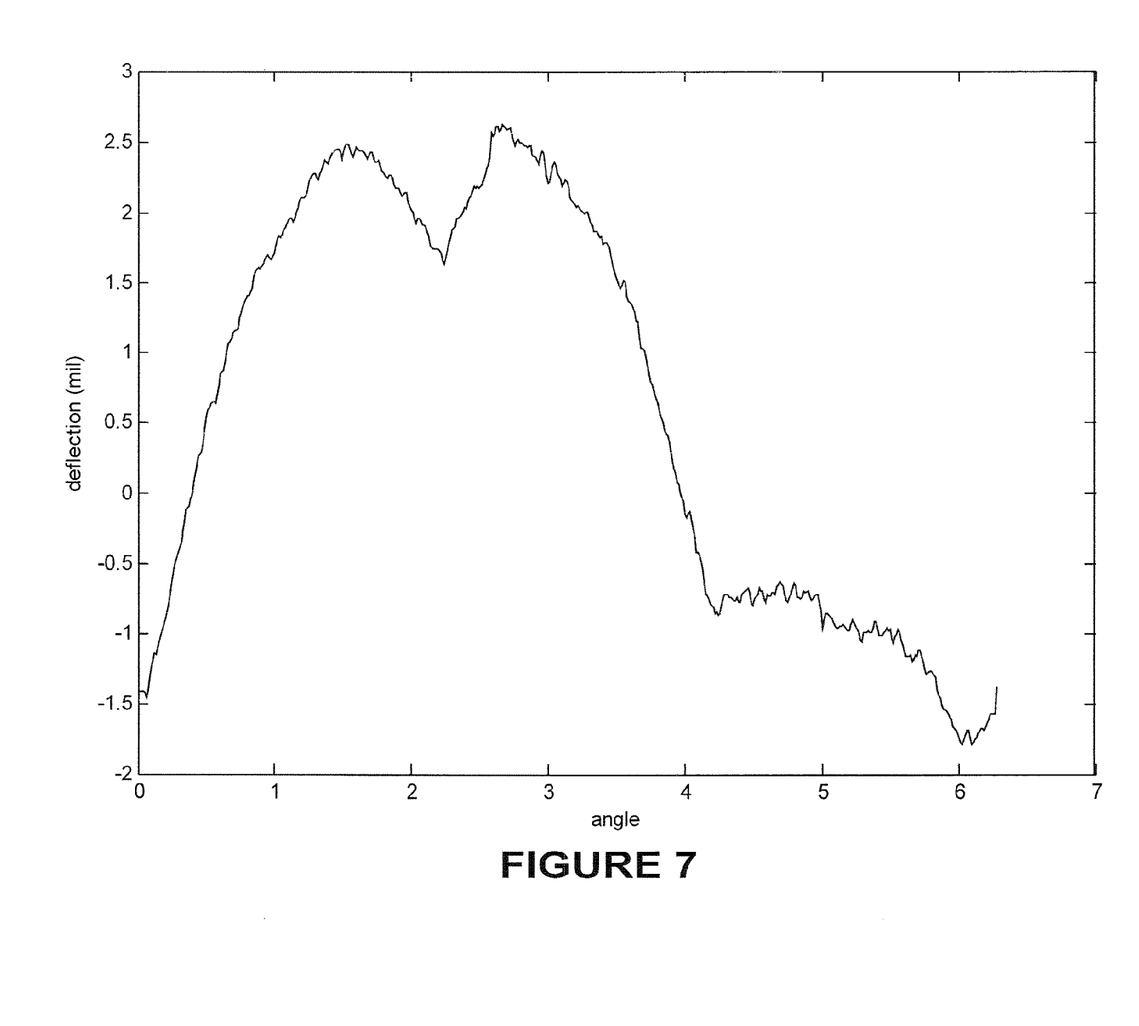

FIGS. 5 to 9 are generally exemplary of the types of output produced by computer 109 as a result of processing the data received from sensor 105. FIG. 5 demonstrates graphically the radial displacement data taken over multiple rotations of the work piece 101 with the indicator 102 attached to the work piece. The vertical axis shows the amount of displacement detected by the sensor 105. FIG. 6 illustrates six cycles of displacement data displayed graphically after undergoing filtering operations to remove the artificial artifact data created by indicator 102 from the output. FIG. 7 illustrates a single cycle graphical readout of runout data. This single cycle graphical output could be actual data from a single rotation around one circumference, i.e., a slice, of the work piece. This single cycle graphical output could also, in the alternative, be generated as an average of the data taken over multiple cycles of data from a single slice. This single cycle graphical output could also, in another alternative, be generated as an average of the circumferential radial displacement data sampled from multiple radial slices along the length of the work piece.

Figure 8:
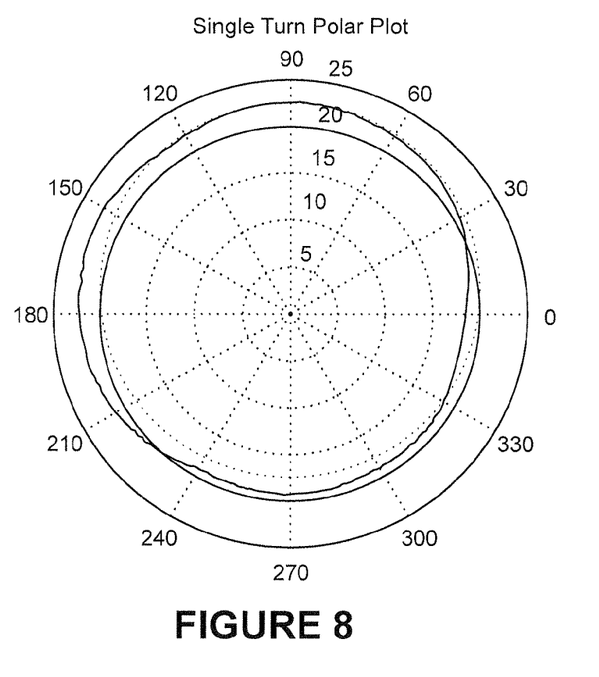
Figure 9:
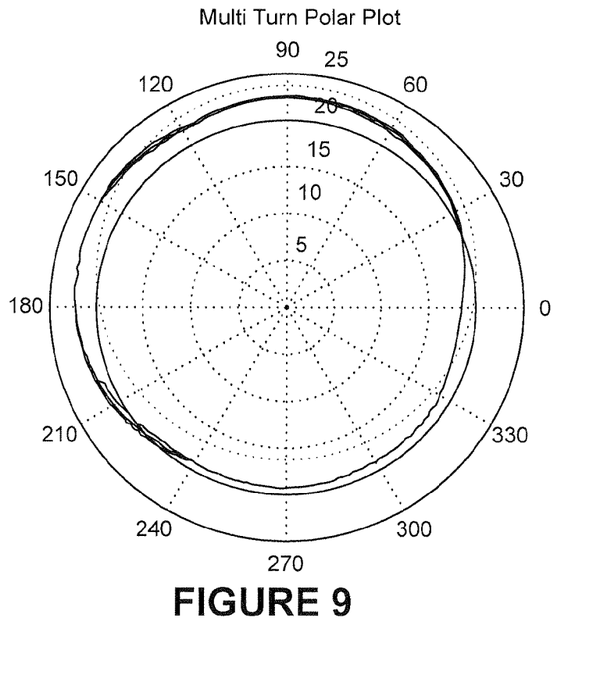

FIG. 8 illustrates a graphical output demonstrating the roundness of the work piece via a polar plot. FIG. 8 contains a control circle illustrating a perfectly circular trajectory and the data for a single rotation around one circumference of the work piece. This single cycle graphical output could also, in the alternative, be generated as an average of the data taken over multiple cycles of data from a single slice. This single cycle graphical output could also, in another alternative, be generated as an average of the circumferential radial displacement data sampled from multiple radial slices along the length of the work piece. FIG. 9 illustrates multiple rotation data plotted on a polar graph. FIG. 9 also contains a control circle for comparison. The multiple rotation data plotted could be derived from a single circumference data taken multiple times or, in the alternative, data from multiple slices plotted on the same polar graph.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:
1. A mechanical runout measurement system comprising:
   a rotatable mount for a work piece, wherein the mount is configured to rotate the work piece;
   a displacement sensor proximate to a surface of the work piece, at a known position relative to the mount, and configured to measure a radial dimension of the work piece;

a removable angle indicator attached to the work piece and aligned such that the angle indicator is sensed by the displacement sensor during rotation of the work piece, and a computer system including a non-transitory memory which stores instructions that, when performed, cause the computer to:
collect radial displacement data from the displacement sensor adjacent to the mount, wherein the radial displacement data indicates a radial dimension of a surface of the work piece;
continue the collection of the radial displacement data as the work piece rotates about the mount;
detect a portion of the radial displacement data representing the angle indicator in the collected radial displacement data;
set an angular starting point at the portion;
correlate each point of the radial displacement data with an angular location relative to and based on the angular starting point to determine a rotational position for the collected radial displacement data of the work piece relative to the angle indicator.

2. The mechanical runout measurement system of claim 1, wherein the instructions when performed further cause the computer to filter the portion of the radial displacement data indicating the angle indicator from the radial displacement data.

3. The mechanical runout measurement system of claim 1, wherein the instructions when performed further cause the computer determine the difference between a desired radial displacement and the radial displacement indicated by the radial displacement data.

4. The mechanical runout measurement system of claim 1, wherein the computer system further includes instructions configured to provide graphical output corresponding to the radial displacement data collected from the displacement sensor.

5. The mechanical runout measurement system of claim 4, wherein the computer system further includes instructions to present the data graphically in a graphical plot illustrating radial displacements of the work piece around a circumference of the work piece.

6. The mechanical runout measurement system of claim 4, wherein the computer system further includes instructions to present the data graphically as a one polar graph illustrating radial displacements around at a circumference of the work piece.

7. The mechanical runout measurement system of claim 1 further comprising a machining tool, the machining tool being configured to alter the work piece during rotation to reduce the radial dimension of the work piece.

8. The mechanical runout measurement system of claim 7, wherein the computer system further includes instructions configured to use the displacement sensor to resample the radial displacement after altering the work piece.

9. A method of measuring mechanical runout comprising:
mounting a work piece on a rotatable mount, wherein the mount is configured to rotate the work piece;
placing a displacement sensor at a known position adjacent a surface of the work piece, the displacement sensor being configured to measure a radial dimension of the work piece;
attaching a removable angle indicator to the surface of the work piece;
rotating the work piece while mounted on the mount and collecting rotational data of the rotational position of the work piece during the rotation;
collecting displacement data from the displacement sensor as the work piece rotates, wherein the displacement data indicates a radial distance from a rotational axis of the work piece to the surface of the work piece at points on the surface as the surface rotates with respect to the displacement sensor;
analyzing the displacement data to detect data representing the angle indicator on the surface of the work piece;
correlating the displacement data with the rotational data, and
determining displacements of points on the surface of the work piece based on the correlated displacement data.

10. The method of claim 9 further comprising generating a presentation of the determined displacements.

11. The method of claim 10, wherein the presentation shows the determined displacements overlapped with desired displacements for the work piece.

12. The method of claim 9, further comprising filtering the detected data representing the angle indicator from the displacement data before determining the displacements.

13. The method of claim 9, wherein the attachment of the removable angle indicator includes applying a wire to the surface and attaching the wire with an adhesive tape applied over the wire and the surface.

14. The method of claim 9, further comprising removing material from the surface of the work piece with a cutting tool fixed to the mount, wherein an amount of material to be removed is determined from the determined displacements.

15. The method of claim 9, further comprises moving the displacement sensor axially along the work piece while the work piece remains mounted to the mount and collecting displacement data from the displacement sensor as the work piece rotates and using the additional displacement data to determine displacements of points on the surface of the work piece.

* * * * *